Figure 1:
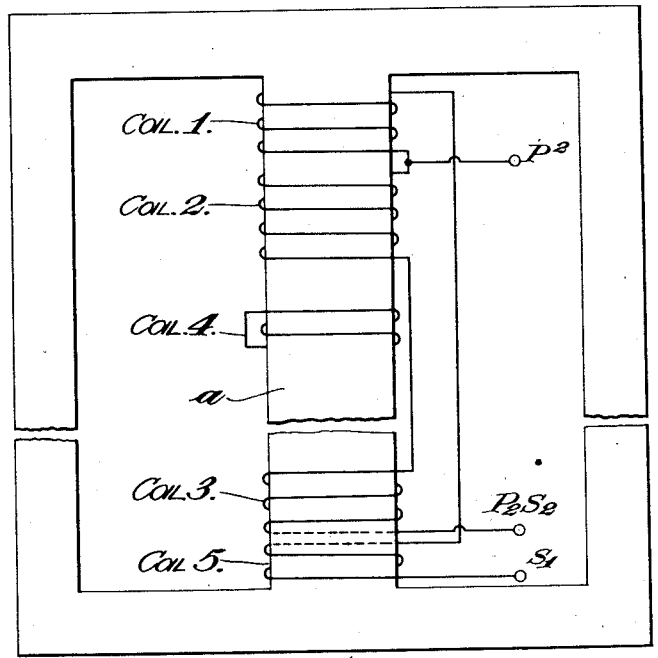

Nov. 12, 1935.  E. D. T. NORRIS  2,020,796

REGULATION OF VOLTAGE

Filed March 31, 1934

E. D. T. Norris
INVENTOR

By Marks & Clerk
ATTYS.

Patented Nov. 12, 1935

2,020,796

UNITED STATES PATENT OFFICE 2,020,796

REGULATION OF VOLTAGE

Eric Douglas Tobias Norris, Hollinwood, England, assignor to Ferranti Inc., New York, N. Y.

Application March 31, 1934, Serial No. 718,495
In Great Britain May 12, 1931

2 Claims. (Cl. 171—119)

This invention which is a continuation in part of that of my application Serial No. 604,802, filed on 12th April, 1932, relates to the regulation of the voltage of a power supply system or other A. C. circuit without disconnecting the load or breaking the circuit.

Hitherto such results have usually been accomplished by induction regulators or by transformers with tappings. The former are only suitable for relatively small sizes and are expensive and difficult to construct mechanically.

In induction regulators the movable iron core carrying the movable windings is composed of laminated iron sheets with which it is notoriously extremely difficult to prevent vibration and chattering in practice. Furthermore, the forces exerted upon such movable core are considerable and are variable in magnitude in dependence upon the position of the core relative to the fixed core. Again, flexible connections or sliding connections to the movable coils are needed and these coils have to be embedded in slots in order that a small air gap may be provided between the moving and fixed cores.

It has been proposed to modify such regulators by disposing primary and secondary windings in pairs on one of the fixed iron cores and to provide the movable core with a short-circuited winding embedded in slots therein, movement of the latter core serving to vary the relative proportion of the two induction fluxes and thus to enable regulation of the secondary voltage to be effected.

It has also been proposed to mount the movable core carrying the short-circuited windings in slots therein so that this core is slidable in relation to concentrically disposed coils incorporated in the fixed core, these fixed coils comprising two series connected primary windings having considerable mutual leakage reactance and two auto-connected secondary windings connected in series but operating in opposite sense magnetically.

This arrangement still does not avoid the practical difficulties indicated above or the further difficulties such as sliding magnetic joints, wave form distortion, harmonics and variation in eddy current losses attending the use of a slidable iron core carrying a short-circuited winding.

The object of the present invention is to provide means whereby a bucking or boosting of the secondary voltage of an auto transformer may be obtained alternatively at will without disconnecting the load or breaking the circuit and in a uniform and gradual manner, the arrangement being free from the disadvantages indicated above.

According to the present invention I provide a system of regulating the voltage of an A. C. circuit comprising an auto transformer whose primary is composed of two windings connected electrically in series and mutually disposed so as to possess considerable leakage reactance and whose secondary includes two winding portions in series but operating magnetically in opposite sense respectively closely associated inductively with the two windings composing the primary and a short-circuited winding devoid of any movable iron core capable of movement in relation to said primary windings.

According to a further feature of the present invention I provide an arrangement as set forth above wherein one of the secondary winding portions is formed as part of one of the primary windings.

In the accompanying diagrams:—

Figure 3:
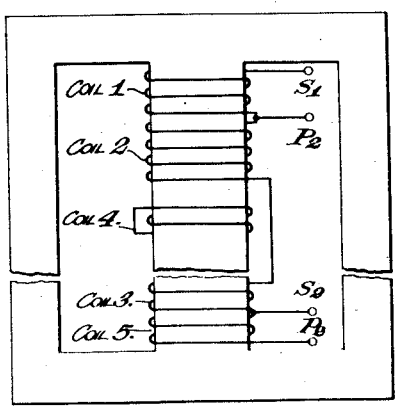
Figure 2:
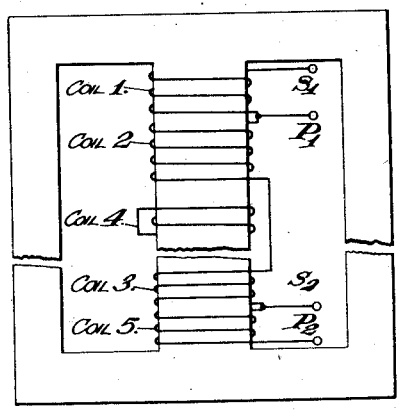

Figures 1, 2 and 3 illustrate by way of example three different arrangements embodying the present invention.

According to the arrangement of Figure 1 the primary winding of a transformer comprises two windings 2 and 3 mounted on a laminated iron core limb $a$ and connected electrically in series but possessing considerable leakage reactance. Adjacent these coils is a short-circuited winding 4 devoid of any movable iron core also encircling the limb $a$, this winding being capable of occupying a position adjacent the coil 2, a position adjacent the coil 3 or any intermediate position at will. The primary winding terminals are represented by $P_1$, $P_2$. The secondary winding of the transformer whose terminals are represented by $S_1$, $S_2$ comprises two coils 1, 5 connected electrically in series but in opposite sense associated magnetically with the coils 2 and 3 respectively so that, with the short-circuited winding 4 devoid of movable iron core occupying a position adjacent the coil 3, the main primary voltage drop occurs across the coil 2 whereas, when the short-circuited coil occupies a position adjacent the coil 2, the main voltage drop is across the coil 3. Consequently, either a bucking or a boosting effect upon the secondary voltage is readily obtained by axial movement of the coil 4. The amount of bucking and boosting effect which it is desired to obtain may be varied by varying the number of turns of the coils 1 and 5.

According to the modified arrangement illustrated in Figure 2 the coils 1 and 5 of Figure 1 are connected respectively in the two secondary leads.

According to the further modified arrangement illustrated in Figure 3 the coil 1 is connected in the secondary lead $S_1$ but the winding 5 is actually constituted by part of the primary winding 3, the secondary terminal $S_2$ being connected to a tapping point on the winding 3.

It will be appreciated that according to the present invention since there are no magnetic air gaps chattering and wear of bearings are negligible. Furthermore, no noise or vibration is introduced by the presence of the movable short-circuited coil. Furthermore, since the moving coil is subjected to forces acting in opposite directions from the fixed coils, these forces tend to force the latter coils against the framework and coil supports whilst the resultant force on the moving coil itself, the latter being devoid of any movable iron core, is extremely small due to this neutralization and at no load is zero for any position of the short-circuited coil.

The greatest forces occur when the short-circuited coil is at its lowermost position but these act in opposition to the weight of this coil due to gravity.

In practice the forces exerted on the short-circuited coil are so small that except in the case of the largest regulators a motor of the induction disc type having an extremely small torque is found to be sufficiently powerful to effect the required movements of the short-circuited coil.

Under short circuit conditions the forces on the movable coil do not increase as the square of the load current owing to saturation of the fixed iron core and consequently the short circuit forces are much lower in relation to normal load forces than in ordinary transformers, moreover, the short-circuited coil being of simple form it is easy to hold it mechanically and it can be securely braced and clamped to resist mechanical stresses. Furthermore, since the short-circuited coil is not disposed in slots the provision of adequate insulation presents no difficulty.

Having now described my invention, what I claim as new and desire to secure by Letters Patent is:—

1. An alternating voltage regulating device comprising an auto transformer whose primary is composed of two windings connected electrically in series and mutually disposed so as to possess considerable leakage reactance and whose secondary includes two winding portions in series but operating magnetically in opposite sense respectively closely associated inductively with the two windings composing the primary and a short-circuited winding constituting the sole movable electromagnetic element of said device capable of movement in relation to said primary windings.

2. An alternating voltage regulating device as claimed in claim 1 wherein one of the secondary winding portions constitutes part of the primary winding with which it is closely associated inductively.

ERIC DOUGLAS TOBIAS NORRIS.